US007236588B2

(12) United States Patent
Gartrell

(10) Patent No.: US 7,236,588 B2
(45) Date of Patent: Jun. 26, 2007

(54) INTERLOCKING COVER FOR MOBILE TERMINALS

(75) Inventor: Andrew Julian Gartrell, Tarzana, CA (US)

(73) Assignee: Nokia Corporation, Espoo (FI)

(*) Notice: Subject to any disclaimer, the term of this patent is extended or adjusted under 35 U.S.C. 154(b) by 94 days.

(21) Appl. No.: 10/734,388

(22) Filed: Dec. 12, 2003

(65) Prior Publication Data

US 2005/0130721 A1 Jun. 16, 2005

(51) Int. Cl.
*H04M 1/00* (2006.01)
(52) U.S. Cl. .............................. 379/433.01; 379/433.11; 455/347; 455/575.1; 455/90.3
(58) Field of Classification Search ........... 379/433.01, 379/433.11; 455/347, 575.1, 90.3
See application file for complete search history.

(56) References Cited

U.S. PATENT DOCUMENTS

| | | | | |
|---|---|---|---|---|
| 2,487,400 A | | 11/1949 | Tupper | |
| 5,383,091 A | * | 1/1995 | Snell | 361/679 |
| 5,386,084 A | * | 1/1995 | Risko | 455/347 |
| 5,613,237 A | * | 3/1997 | Bent et al. | 455/347 |
| 5,657,516 A | | 8/1997 | Berg et al. | |
| 6,594,472 B1 | | 7/2003 | Curtis et al. | |
| 6,701,159 B1 | * | 3/2004 | Powell | 455/575.8 |
| 6,847,806 B2 | * | 1/2005 | Curtis et al. | 379/433.11 |
| 2003/0143961 A1 | | 7/2003 | Humphreys et al. | |
| 2005/0022924 A1 | * | 2/2005 | Blackburn | 379/433.11 |

FOREIGN PATENT DOCUMENTS

| | | |
|---|---|---|
| EP | 1 017 259 A2 | 7/2000 |
| EP | 1 130 879 A1 | 9/2001 |

\* cited by examiner

*Primary Examiner*—Quynh H. Nguyen
(74) *Attorney, Agent, or Firm*—Alston & Bird LLP

(57) ABSTRACT

An assembly for a mobile terminal, or a portable electronic device such as a cellular telephone or a personal digital assistant, is provided that includes a chassis with a locking perimeter and at least one covering, such as a front and/or a rear cover, with a locking edge. A cover may include a void or window for viewing a display of the electronic device and a keymat to control the electronic device. The chassis may include a convex groove in which a bracelet or wrap may be included.

59 Claims, 13 Drawing Sheets

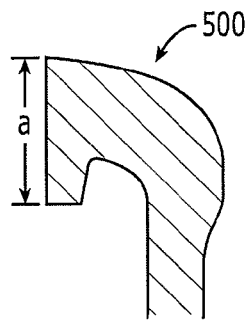 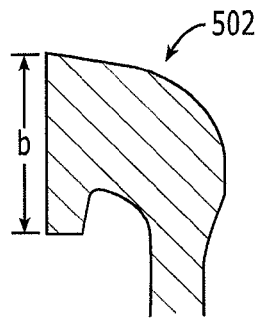 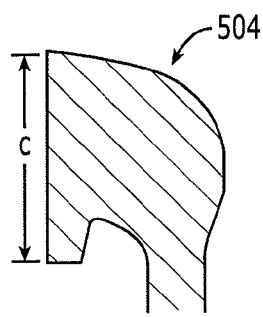
FIGURE 14A  FIGURE 14B  FIGURE 14C
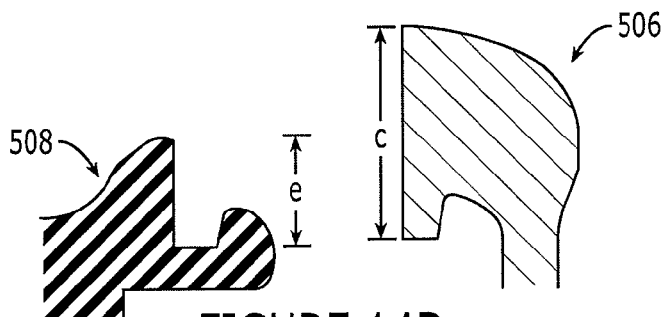
FIGURE 14D
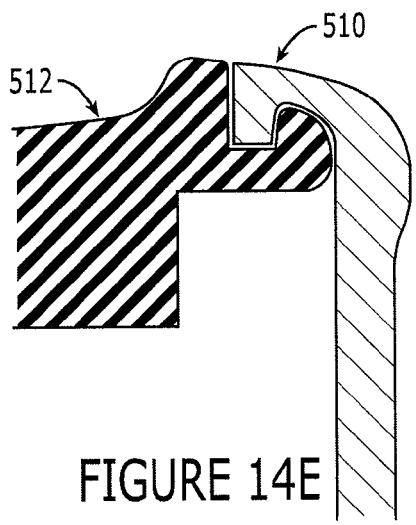
FIGURE 14E
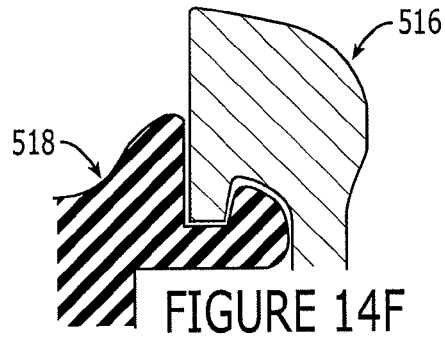
FIGURE 14F
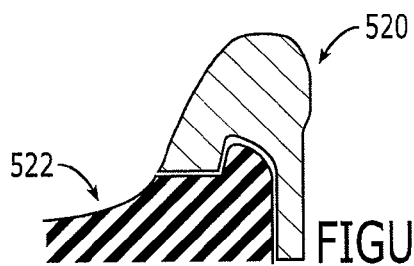
FIGURE 14G
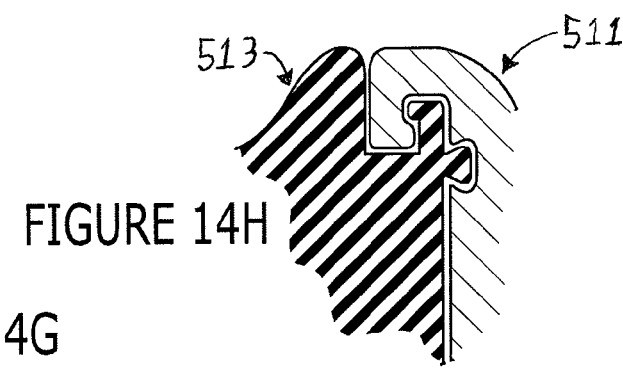
FIGURE 14H

INTERLOCKING COVER FOR MOBILE TERMINALS

FIELD OF THE INVENTION

The present invention relates generally to coverings for mobile terminals, and, more particularly, to interlocking covers for mobile phones and other mobile terminals.

BACKGROUND

The existing cellular telephone industry involves crowded product and services markets. Companies are endlessly competing to launch new products with improved technologies. At the same time, manufacturers are constantly working to provide easy-to-use phone designs that provide maximum conceptual impact with a minimum amount of production and construction effort. The endless competitive cycle encourages manufacturers to produce different shapes and sizes of phones to distinguish their phones from the phones of their competitors. Generally, each phone of a different shape and size demands a different housing which, in turn, decreases part consolidation between different phones because parts for one phone will not work on or fit in another phone. A decrease in part consolidation is increasingly problematic as the complexities of cell phones and the attempts to change the appearance of the phones causes increasing field failure rates (FFR).

Previous attempts to customize user-interfaces include specialized housings that are created using many small parts, including, for example, a rigid front cover, a window, a moving keymat, and a back cover, each coupled to the cell phone engine or chassis. As noted above, every specialized part designed for a phone having a different appearance, decreases part consolidation. Field failure repairs become more costly to a manufacturer when replacement parts, for example replacement housings or displays for broken or scratched housings or displays, require specialized parts for a particular phone. Similarly, many specialized housing shapes require internal components to be manufactured in corresponding specialized shapes, also decreasing part consolidation increasing the field failure repair costs for internal component damage.

A present method of changing the appearance of phones without designing specialized housings and corresponding specialized parts that decrease part consolidation is to provide interchangeable housings to the customers. See, for example, U.S. Pat. No. 6,594,472 to Curtis et al. While this type of cover has been readily accepted by the market and often provides quick replacement housings, these interchangeable covers are limited in application, variety, build strength, and unit protection. Interchangeable covers and locking mechanisms often are made of hard plastic that is susceptible to breakage or requires complicated assembly procedures. The hard plastic may crack or break when a phone is dropped, and a hard plastic cover does not provide substantially increased protection for the internal components of the phone unit. A snap on housing assembly may be hard to remove or may crack or break as a result of an improper assembly attempt, under the required forces for assembly, or from repetitive wear of a user manipulating the snapping assembly such as from play or a nervous or fidgeting habit. Also, with these types of interchangeable housing covers, internal components may be exposed when an interchangeable housing is removed, allowing the internal components to become loose, detached, or even break.

Existing interchangeable phone covers made from hard plastic materials are also limited in the variety of appearances for phones. Typically, a portable telephone or personal digital assistant (PDAs) has a keypad and a window or display integrated into the front of the phone or personal digital assistant unit. A display window or screen provides visual information for the user to operate the phone, and a keypad allows the user to input data and control the operation of the phone or personal digital assistant. An alphanumeric keypad is usually included and has at least ten keys corresponding to the numbers 0 to 9, typically also including keys for # and * symbols. Function keys are also usually included and may provide on and off control or activation and suspension modes for a device, menu functions, cursor movement for at least up and down and left and right directions, volume adjustment, and selection commands. Phones may now also include specific keys for digital picture, email, and web browsing functions. As such, different models of phones often require different keymats. However, existing interchangeable phone covers made from hard plastic materials cannot be made with different keymat designs because the keyholes of a hard plastic cover must correspond to a fixed keypad design incorporated on the phone.

Existing phones and covers therefore do not provide sufficient variability to accommodate one repeatedly changing size and shape of cellular telephones and similar personal electronic products, while at the same time being interchangeable to reduce part count and providing the necessary protection for the internal electronics.

A new type of housing or covering is needed to improve the ability to alter the appearance of a phone while maintaining or increasing part consolidation, providing a durable replacement housing, and allowing for varieties in display windows or screens and keymat assemblies. An interchangeable housing or cover that decreases the field failure rate of phone and personal digital assistant components, particularly internal components, is also needed.

SUMMARY

An assembly for a mobile terminal, or portable electronic device such as a cellular telephone or a personal digital assistant, is provided. An assembly for a mobile terminal of one embodiment of the present invention includes a chassis, a locking perimeter, a covering with a continuous locking edge removably secured to the chassis by interlocking the continuous locking edge in the locking perimeter of the chassis. An assembly for a mobile terminal of another embodiment of the present invention includes another locking perimeter on the chassis and another covering with a locking edge for removably securing the second covering to the chassis, thus providing a chassis with a front and rear cover. In a further embodiment of an assembly for a mobile terminal of the present invention, a covering defines a circumscribed void there through, possibly a display window or display screen. In a further embodiment of an assembly for a mobile terminal of a present invention, an electronic device is included and retained by the chassis, and the covering includes actuators that engage the electronic device, typically keymat plungers that activate switches on a key dome sheet or other data or function actuators. Grooves may separate the actuators of a keymat to allow for selective engagement of an individual key. In a further embodiment of an assembly for a mobile terminal of the present invention, actuators of the keymat provide interface control of the electronic device retained by the chassis.

Interface control may include activating or suspending the electronic device, indicating movement or selection for operation of the electronic device, or inputting numerical, alphabetical, or symbolic data. In one embodiment of an assembly for a mobile terminal, a traditional numeric keypad may be included on a covering for engaging an electronic device.

In another embodiment of an assembly for a mobile terminal of the present invention, the chassis may define a convex groove between the front and rear locking perimeters. A bracelet or wrap may be included in the groove.

An interlocking body cover is provided. An interlocking body cover of an embodiment of the present invention includes a membrane with an elastomeric continuous locking edge along the outer perimeter of the membrane. This continuous locking edge is directed downwardly from the bottom surface of the membrane and toward the inner section of the membrane. All or part of the membrane may be a translucent material, and the membrane and/or continuous locking edge may be a multicolored material. In another embodiment of an interlocking body cover of the present invention, the membrane may define a circumscribed void there through comprising a display window disposed in a void.

A further embodiment of an interlocking body cover of the present invention may include a flexible keymat on the bottom surface of the membrane. The keymat may include actuators, typically keymat plungers for activation of switches on a keydome sheet, with grooves between individual actuators or rows of actuators to provide selective engagement of individual keys. The keymat may include a numeric or alphanumeric keypad with corresponding actuators.

An interlocking chassis is provided. An interlocking chassis of one embodiment of the present invention includes a rigid circumference with locking perimeters at the front and rear edges. In another embodiment of an interlocking chassis of the present invention, the rigid circumference may define a concave groove around which a bracelet or wrap may be added to increase the personalized appearance of an interlocking chassis of the present invention.

The variable covers of the present invention provide marketplace differentiation by the creation and use of a soft-on-hard architecture. Using a common chassis with variable cover designs increases part consolidation, thus reducing manufacturing and field failure repair costs. The soft-on-hard assembly of the present invention with durable elastomeric front and rear covers and a rigid chassis provides protection for the chassis and internal electronic components, potentially lessening field failure rates due to accidental knocks, drops, and general wear and tear, and the elastomeric composition of the covers reduces potential damage to the covers. A single surface front cover of an embodiment of the present invention provides an usually large user interface for ease of use and accessibility. The design of replaceable interlocking covers of the present invention provides cosmetic or aesthetic personalization opportunities where a user can exchange covers for other covers of different materials, coloring, and features. A rigid chassis of an embodiment of the present invention provides a secure gripping channel in the convex groove or a secured gripping surface when a bracelet or wrap is placed around the groove. The convex groove in the chassis also provides cosmetic and functional personalization opportunities such as by wrapping bracelets, fabric, electronic bands, and other devices around the chassis.

The assembly, covering, and chassis of the present invention provide a new type of housing and covering to improve the ability to alter the appearance of a phone while maintaining or increasing part consolidation, providing a durable replacement housing, allowing for varieties in display windows or screens and keypad or keymat assemblies, and decreasing the field failure rate of phone and personal digital assistant components or other electronic devices.

BRIEF DESCRIPTION OF THE DRAWING(S)

Having thus described the invention in general terms, reference will now be made to the accompanying drawings, which are not necessarily drawn to scale, and wherein:

Figure 15:
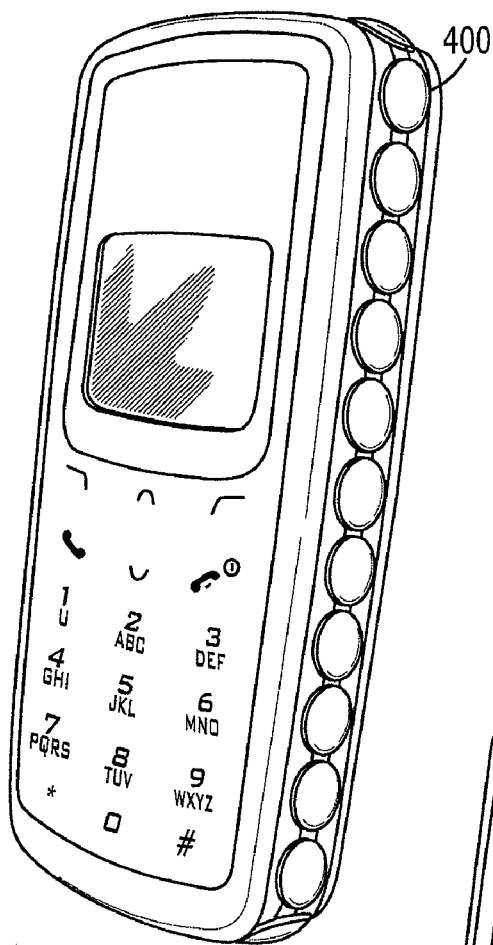
Figure 16:
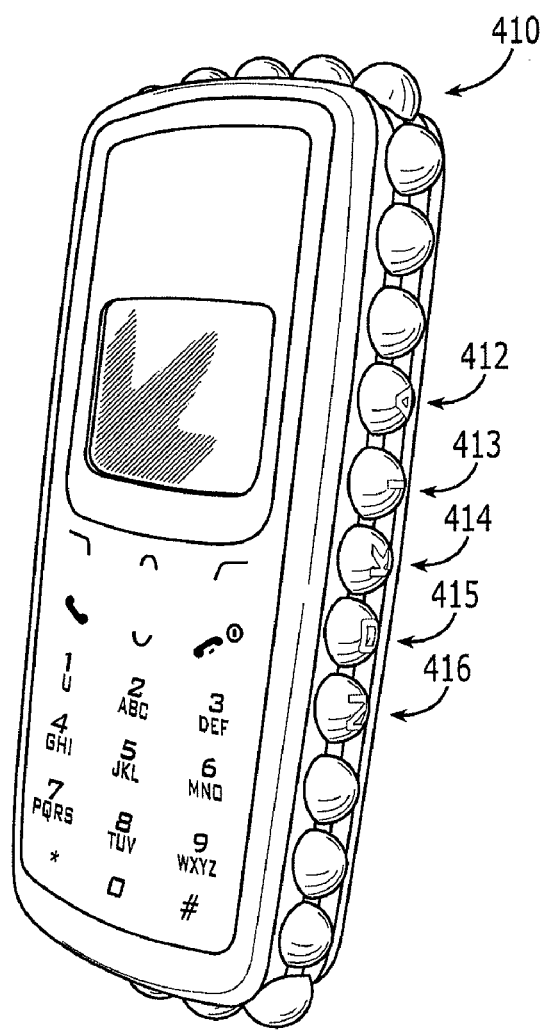
Figure 17:
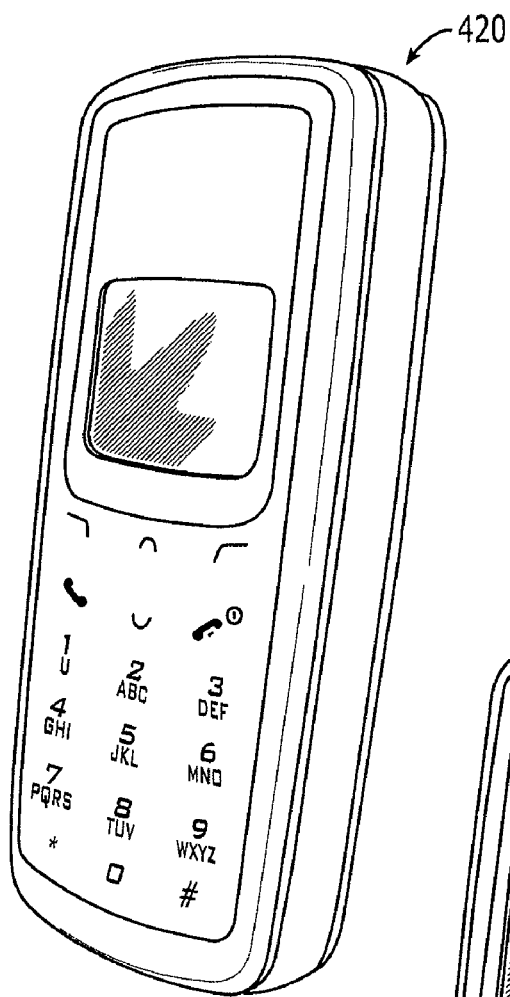
Figure 18:
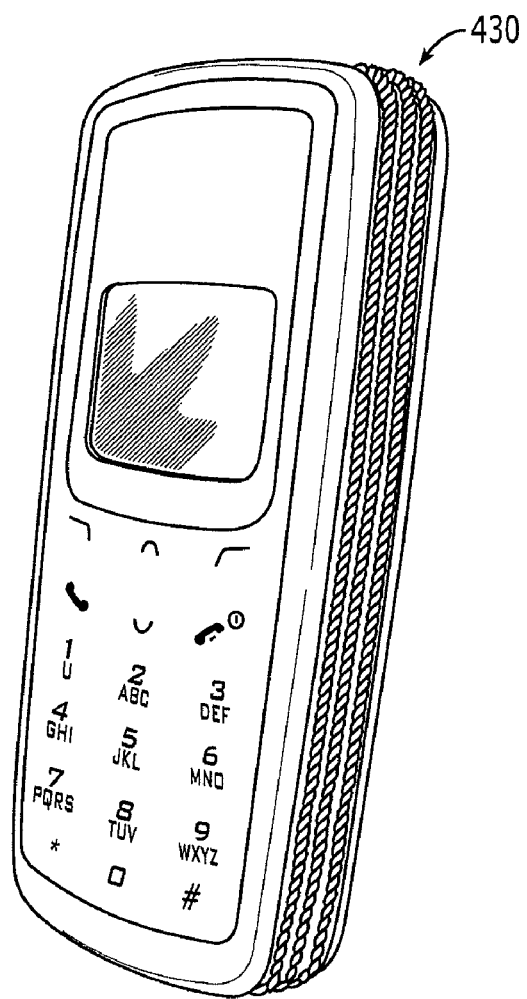
Figure 19:
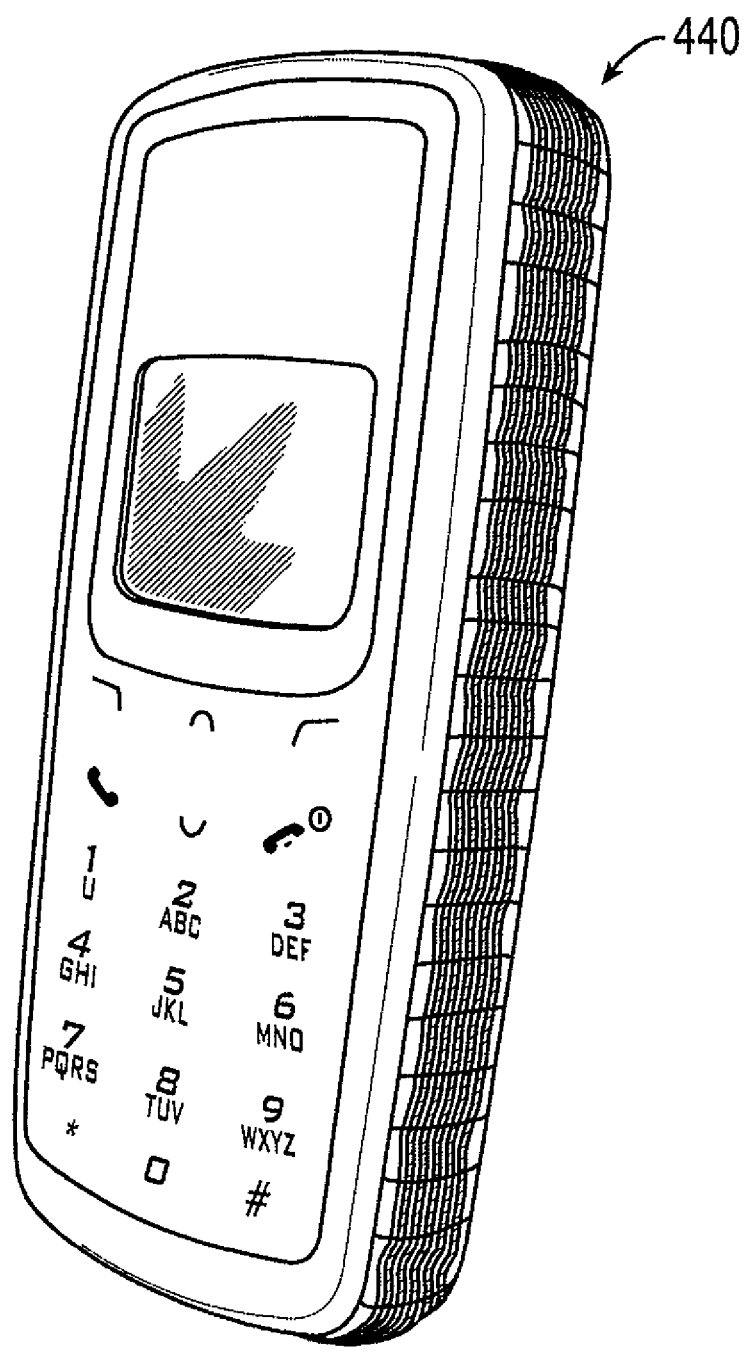
Figure 20:
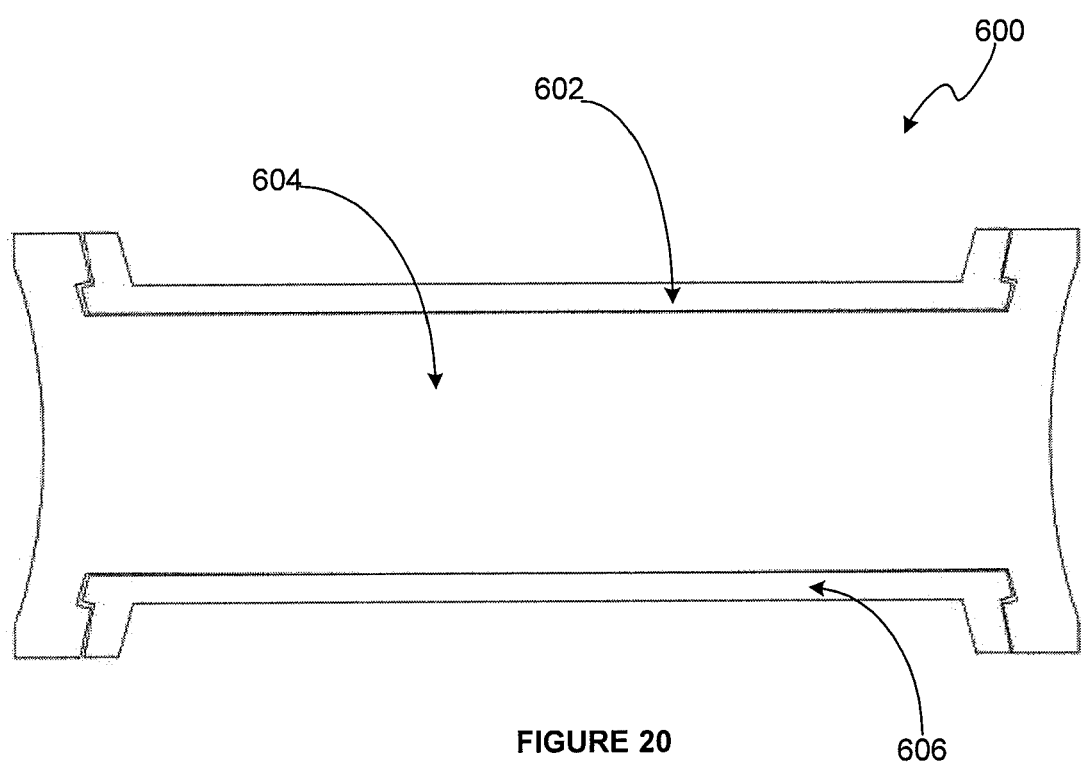

FIGS. 14A-G shows fragmentary cross-sectional views of perimeters and edges of various embodiments of interlocking chassis and interlocking body covers of the present invention;

FIG. 15 is a perspective view of one embodiment of a cellular phone employing interlocking body covers and an interlocking chassis of the present invention with a bead bracelet in a groove of the chassis;

FIG. 16 is a perspective view of one embodiment of a cellular phone employing interlocking body covers and an interlocking chassis of the present invention with a changeable bead bracelet in a groove of the chassis;

FIG. 17 is a perspective view of one embodiment of a cellular phone employing interlocking body covers and an interlocking chassis of the present invention with a rubber wrap in a groove of the chassis;

FIG. 18 is a perspective view of one embodiment of a cellular phone employing interlocking body covers and an interlocking chassis of the present invention with a repetitive wrap in a groove of the chassis;

FIG. 19 is a perspective view of one embodiment of a cellular phone employing interlocking body covers and an interlocking chassis of the present invention with a light bracelet in a groove of the chassis; and FIG. 20 is a cross-sectional schematic diagram taken from side to side of one embodiment of interlocking front and rear body covers and an interlocking chassis of the present invention.

DETAILED DESCRIPTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

While a primary use of the present invention may be in the field of mobile phone technology, it will be appreciated from the following description that the invention is also useful for many types of devices that are generally referenced herein as mobile terminals, including, for example, handheld data terminals and personal data assistants, portable medical devices, personal multimedia units such as MP3 players, and other portable electronics.

Figure 1:
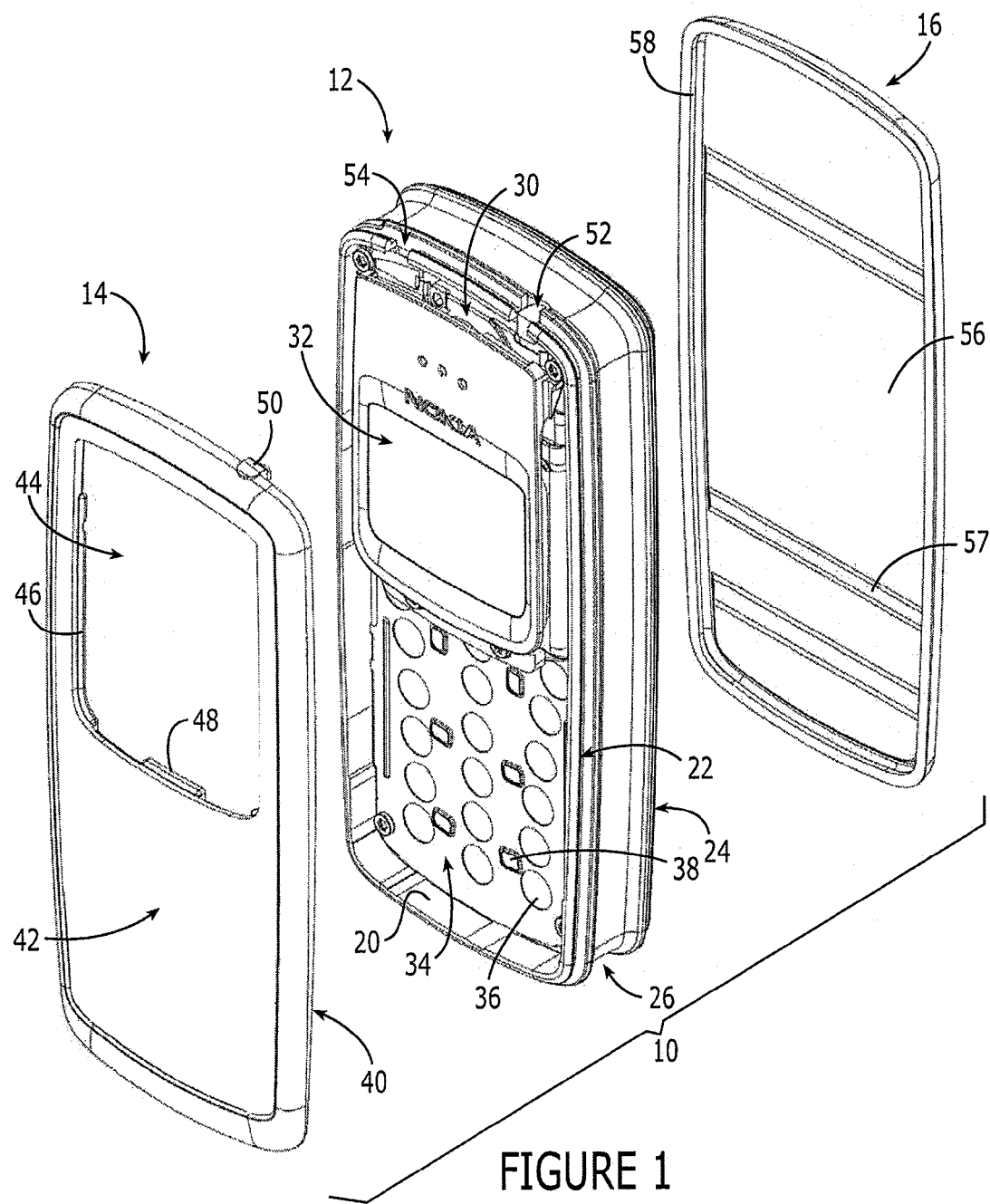
FIG. 1 is an exploded perspective view of an assembly for covering a mobile terminal of one embodiment of the present invention including front and rear interlocking body covers, an interlocking chassis, and a cellular phone electronic device.

FIG. 1 is a graphical diagram of an embodiment of an assembly for covering a mobile terminal, such as a mobile telephone, of one embodiment of the present invention. The embodiment shown in FIG. 1 has a front cover 14 and a back cover 16, both of which attach to a chassis 20 which houses a mobile phone engine or other electronic device 30. The chassis 20 of an embodiment of the present invention may be immensely strong and rigid due to its specific and continuous cross sectional shape and its construction of a relatively strong and durable material such as silicon, a plastic or rubber polymer, or other elastomeric material. The strength of the chassis 20 is ideal to protect more sensitive electronic components housed therein. The exposed edges of chassis 20 distance the electronics from damaging external forces and accept any and all shocks on the periphery of the chassis 20 without necessarily channeling shock forces to the internal components. A convex groove 26 in the chassis 20 may include tactile variations to increase gripping ability when a bracelet or wrap is not used with the chassis 20. For example, bumps or ridges may be formed on the surface of the groove 26. Alternatively, different surfaces may be applied in the groove 26 to improve gripping ability or for a user to identify a gripping location by feel. Interlocking perimeters 22, 24 are rims on the front and rear that follow along the perimeter of the chassis 20. These perimeters provide the means for the "elastic mechanical interlock" with the lid-like front 14 and rear 16 covers.

The front cover 14 attaches to the chassis 20 by the locking edge 40 of the front cover 14 and the locking perimeter 22 of the chassis 20. Locking perimeters 22, 24 of a chassis 20 provide the means for the elastic, mechanical interlock between covers 14, 16 and the chassis 20. Although the locking perimeters of the chassis and the locking edges of the covers are shown to be continuous about the periphery of the mobile terminal, the locking perimeters and locking edges may be discontinuous so long as the locking perimeters and locking edges have sufficient overlap to provide the necessary engagement. To secure the front cover 14 to the chassis 20, the pliable or elastomeric material that forms the locking edge 40 is stretched to wrap around and over the front locking perimeter 22. A user can perform this process by locating a corner of the front cover 14 at a corner of the chassis 20 and tracing the outline of the front cover 14 along the edge of the chassis 20 to stretch the front cover 14 around and over the chassis 20 until all of the remaining front cover free edges have been pulled into place. A cover, or lid, may be removed from a chassis in a similar but reverse manner whereby a user pulls the cover away and off of the chassis. A certain prescribed corner of a cover or pull-away zone 54 may be provided to help a user easily remove a cover. A pull-away zone may simply be a recess 54 in the chassis or an extended lip on a cover to facilitate user engagement. Due to the construction of a locking edge and a locking perimeter, when removing a cover from a chassis, it will feel at first difficult and become increasingly easy as more of the locking edge is detached from the locking perimeter. The locking edge 40 will elastically deform during attachment and removal and locks the lid or cover 14 into a matching inverse locking perimeter 22 on the chassis 20.

To provide the necessary elastic deformation during assembly while also being sufficiently protective, a cover may be made of an elastomeric or pliable material molded from silicone or another elastic material. Other similar materials may be used to create covers that allow the locking edge of the cover to be pliable enough to secure the cover to the locking perimeter of a chassis. Additionally, covers may be made of multiple materials, for example where the body portion of a cover is formed from one material, such as a plastic polymer, and a second, possibly more pliable material such as silicon or a rubber polymer, is used to form the locking edge. The cover is soft and pliable when compared to the rigid and mechanical structures in currently available products. The combination of a rigid chassis and elastomeric cover provides a rugged and reliable personal electronic device. These features may decrease field failure rates by protecting sensitive internal electronic components with a rugged and durable body of elastomeric interlocking covers and a rigid chassis.

In the embodiment of a assembly for covering a mobile terminal of the present invention shown in FIG. 1, the back cover 16 attaches to the chassis 20 by engaging the locking edge 58 of the back cover to the locking perimeter 24 of the chassis 20. A back cover 16 may have a body or membrane portion 56 around which the locking edge 58 is formed. The locking edge 58 will face downward from the inner-section of the membrane 56 and towards the inside of the perimeter of the back cover 16. Ridges or contours 57 may be included in the membrane to better fit a back cover 16 to a particular chassis 20 and electronic device 30 housed therein.

A front cover 14 similarly includes a membrane or body portion 42 around which a locking edge 40 is formed. The membrane of a lid or cover, as shown in the front cover 14 of the embodiment of FIG. 1, may define a circumscribed void or window 44 therethrough. If such a void or window 44 is formed in the membrane 42 of a front cover 14, locking edges 46, 48 may be included to better affix and secure the front cover 14 to the chassis 20 and particularly against the display 32. Void or window locking edges may be continuous around the void or window or discontinuous as shown in FIG. 1.

Also shown in the embodiment of a front cover 14 in FIG. 1 is an extension 50 from the locking edge 40 of the front cover 14. This extension 50 is intended to match with an indentation or recess 52 on the chassis 20 to insure proper alignment and assembly of a front cover 14 on a chassis 20. Different forms of indentations or recesses and corresponding extensions may be used on any lid or cover and chassis configuration. An extension may also provide a functional aspect by covering electronic interfaces of an electronic device, such as ports for connecting an external microphone or a digital camera to a cellular phone engine, housed within a chassis. Since the electronic device that requires the interface may only be available with certain models or service plans, a user who does not use a particular model or subscribe to a particular service plan may be provided with an appropriate lid or cover with an appropriate extension to protect the unused electronic interface. For example, the extension 50 in FIG. 1 also functions as a power button. An extension may be made from a different material from a locking edge or chassis, such as a plastic polymer instead of silicon. An extension and a corresponding indentation or recess may also provide an interface between a front cover and an electronic interface of an electronic device housed in the chassis. The interface may allow a lid or cover to plug into the electronic device in order to gain power from or increase functional control of the electronic device.

As will be understood by one of ordinary skill in the art, the continuous nature of an edge or perimeter as described for an embodiment of the present invention provides a locking ability of a cover to attach to a chassis. A perimeter or edge may be materially discontinuous as with a recess or extension while remaining continuous for purposes of attachment. Such considerations of continuity may be intended, such as to allow moisture that may enter the mobile terminal to evaporate and escape through a recess or to provide a pull away zone or function button as described above.

Figure 12:
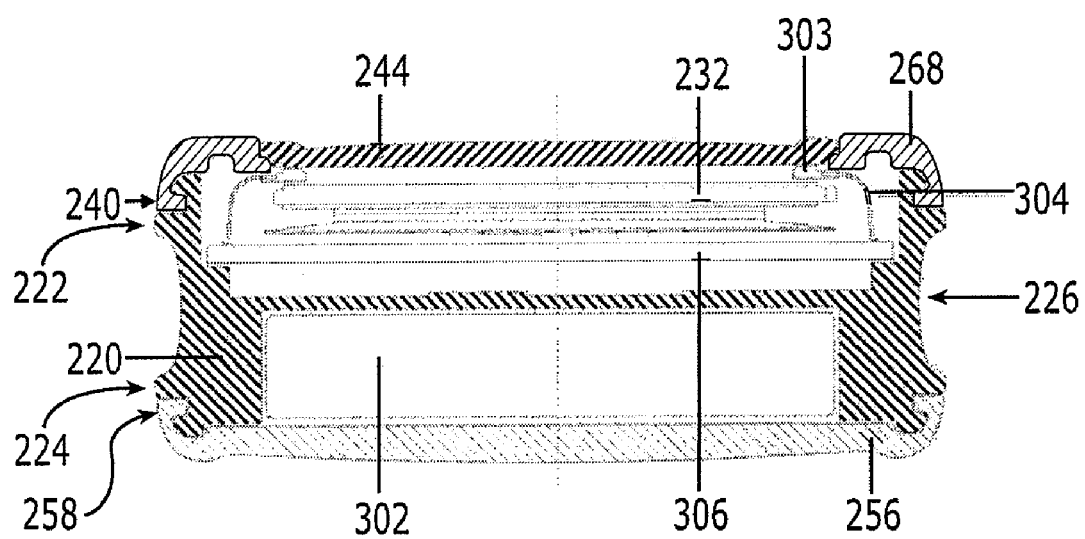
FIG. 12 is a cross-sectional schematic diagram taken from side to side of one embodiment of interlocking front and rear body covers and an interlocking chassis of the present invention for a cellular phone electronic device.
Figure 13:
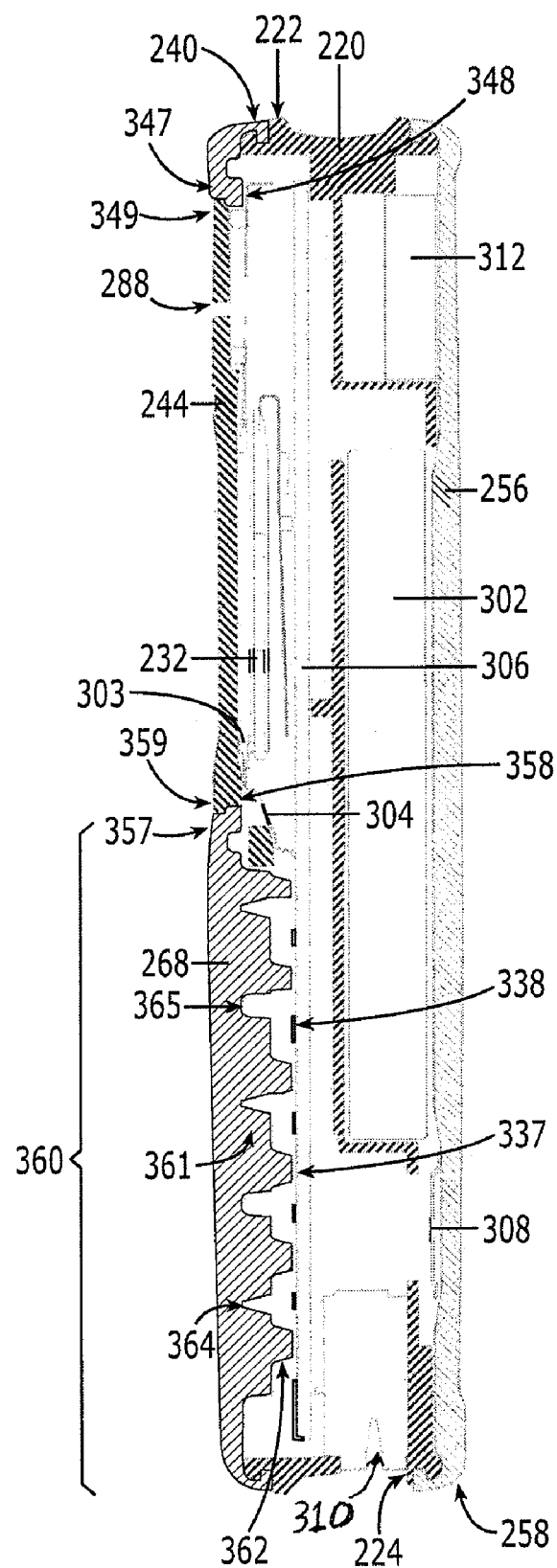
FIG. 13 is a cross-sectional schematic diagram taken from top to bottom of one embodiment of interlocking front and rear body covers and an interlocking chassis of the present invention for a cellular phone electronic device.

A locking edge may be formed by varying the cross-section around the rim of a lid or cover. Similarly, a locking perimeter may be formed by adding an extension with varying cross section to a chassis. Subsequent FIGS. 12, 13, and 14 provide more detailed examples regarding locking edges and locking perimeters.

A void or window 44 on a front cover 14, and/or similarly on a back cover 16, may provide visual access to or allow the emission of auditory information from the electronic device 30 housed in the chassis 20. A liquid crystal display (LCD) or other type of display 32 of the electronic device 30 may be viewed through the void or window 44. The electronic device may also include keydome switches 36 for receiving user input that may be activated by tactile force applied to the membrane 42 of the front cover 14 that overlies the keydome switches. Similar function may be provided through the back cover 16. The keydome switches may comprise a keypad 34 that may incorporate light emitting diodes (LEDs) 38 or other light sources that illuminate a transparent or translucent keymat on the membrane 42 of the front cover 14 that corresponds to the keydome switches 36 of the keypad 34. The membrane 42 of a front cover 14 may therefore be made of a pliable or elastomeric material that allows a user to activate keydome switches 36 on the keypad 34.

Figure 2:
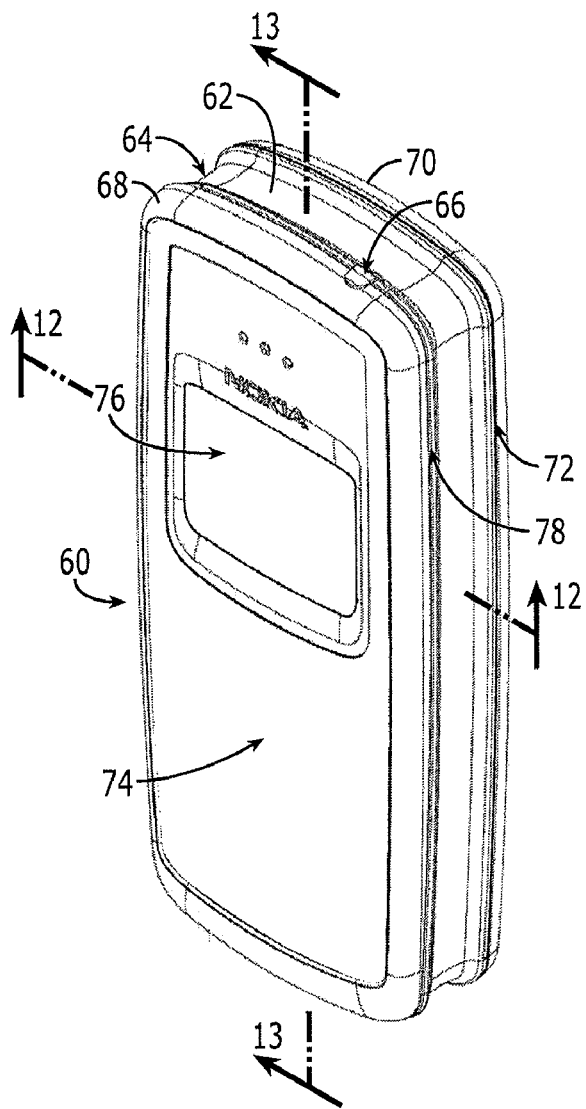
FIG. 2 is a perspective view of one embodiment of a cellular phone employing interlocking body covers and an interlocking chassis of the present invention shown from the front, top, and right side.

FIG. 2 is a perspective view of one embodiment of a cellular phone employing interlocking body covers and an interlocking chassis of the present invention. This embodiment shows an assembled system of the present invention covering a mobile terminal, that is, a cellular phone in FIG. 2. The front cover 68 is attached to the chassis 62 along the intersection 78 of the locking edge of the front cover 68 and a locking perimeter of the chassis 62. The back cover 70 is similarly attached to the chassis 62 at an intersection 72 between the locking edge of the back cover 70 and a locking perimeter of the chassis 62. An LCD display and speaker abscesses are visible through the window 76 formed by the membrane 74 of the front cover 68. Also visible in the embodiment shown in FIG. 2 is a groove 64 along the outer edge of the chassis 62 and an extension or power button 66 in the groove 64.

Figure 3:
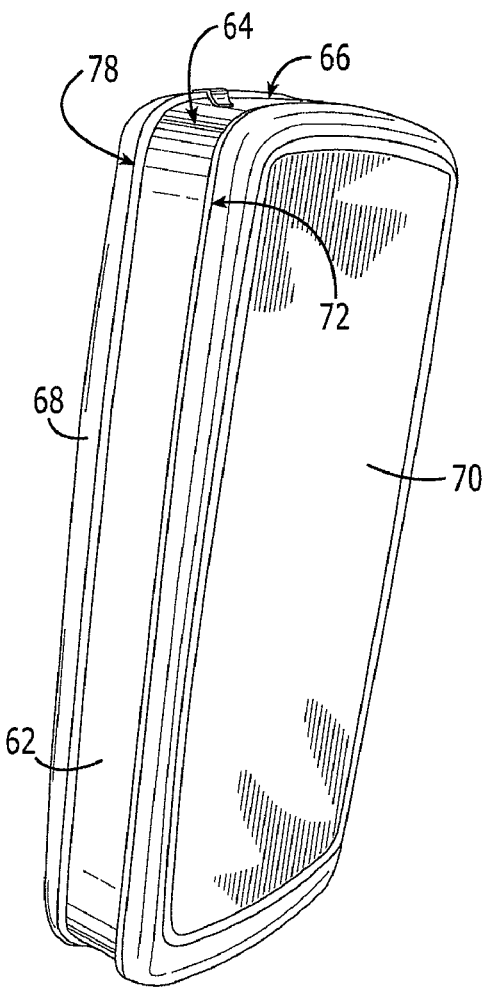
FIG. 3 is a perspective view of one embodiment of a cellular phone employing interlocking body covers and an interlocking chassis of the present invention shown from the rear and right side.

FIG. 3 is a perspective view of one embodiment of a cellular phone employing interlocking body covers and an interlocking chassis of the present invention. The embodiment shown in FIG. 3 is visible from the rear and right side of the embodiment. Thus, the back cover 70 is clearly visible as it is attached to the chassis 62 along the intersection 72 of the locking edge of the back cover 70 and a locking perimeter of the chassis 62. Also visible in the groove 64 of the chassis is the fit between the extension 66 of the front cover 68 as it fits into an indentation in the chassis 62. One of ordinary skill in the art will recognize that an extension, tab, pull away zone, indentation, recess, or other feature on an edge of a cover or perimeter of a chassis is not required of the present invention but may be included to offer additional features, functionality, or aesthetics to the cover or chassis.

Figure 4:
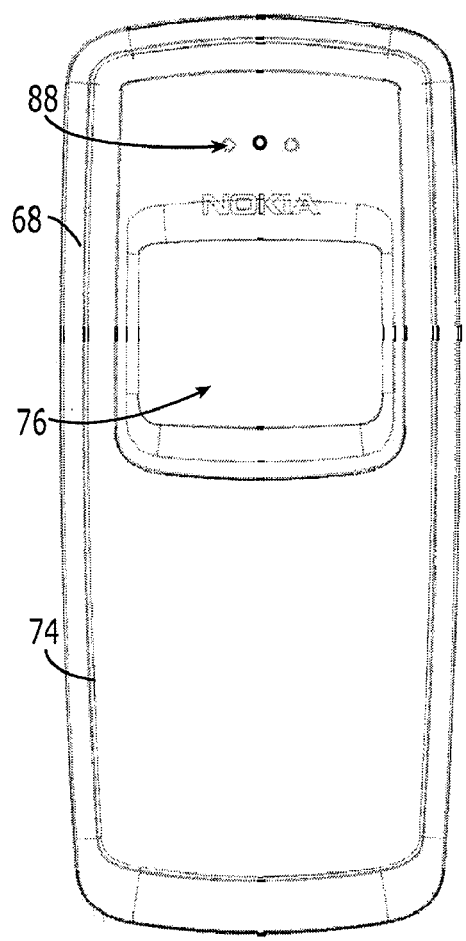
FIG. 4 is a frontal view of one embodiment of a cellular phone employing interlocking body covers and an interlocking chassis of the present invention.

FIG. 4 is a front view of one embodiment of a cellular phone employing interlocking body covers and an interlocking chassis of the present invention. This embodiment is shown from the front where the front cover 68 is fully visible. A front cover may provide all user-interfaced controls including power on/off on the front side and incorporates all necessary keymat plungers on the underside for actuating against traditional metal dome-sheets. A series of transverse grooves formed into the backside of a front cover allows each key to act independent of surrounding keys for selective key actuation. Graphical text and symbols may be applied to a front or rear cover by traditional printing processes on an elastomeric material. Paint and printing may be sufficiently pliable to avoid cracking and crazing during cover removal and insertion and use of the cover on a personal electronic device. Audio or sound recesses 88 may be included in a front cover 68 or window of a front cover.

Figure 5:
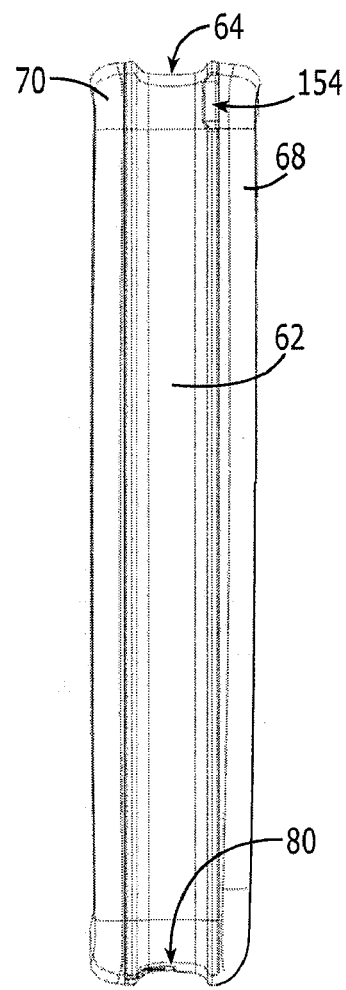
FIG. 5 is a side view of one embodiment of a cellular phone employing interlocking body covers and an interlocking chassis of the present invention.

FIG. 5 is a side view of one embodiment of a cellular phone employing interlocking body covers and an interlocking chassis of the present invention shown from the left side, although the right side is typically identical. In this embodiment, the groove 64 of the chassis 62 is clearly visible between the front cover 68 and the back cover 70. A pull-away zone 154 comprised of an indentation in a perimeter of a chassis to remove a cover from a chassis can also be seen. Slightly visible on the bottom of the chassis 62 is an external system connection 80 that allows for an external electronic device to be connected with the electronic device 30 housed within the chassis 62. Such external system connections may be recessed in the bottom, top, or sides of the chassis 62. By recessing the external system connections in the groove 64 of the chassis 62, the connections are provided additional protection from damage. Such external system connections may include an infrared port, a power socket for charging an internal battery or operating the phone, a headset connection, or other similar electric or data transmitting connection whether or not requiring a physical interface between an external device and an internal electronic device. In addition to external connections, the groove of a chassis may include access ports or doors where, for example, a user may remove or insert a battery or subscriber identity module.

Figure 6:
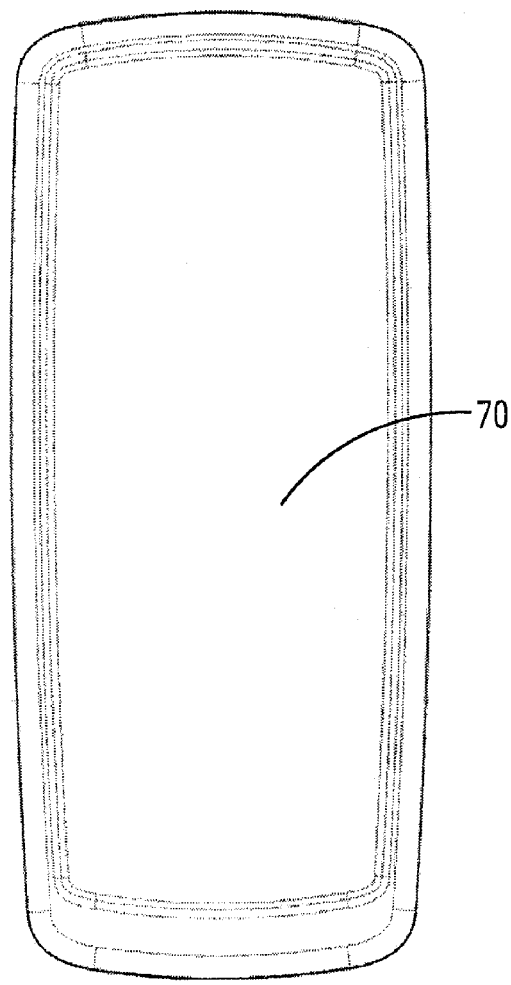
FIG. 6 is a rear view of one embodiment of a cellular phone employing interlocking body covers and an interlocking chassis of the present invention.

FIG. 6 is a rear view of one embodiment of a cellular phone employing interlocking body covers and an interlocking chassis of the present invention such that the back cover 70 is fully visible. By removing the back cover, easy access may be had to replaceable rechargeable batteries and subscriber identity module (SIM) cards where required.

Figure 7:
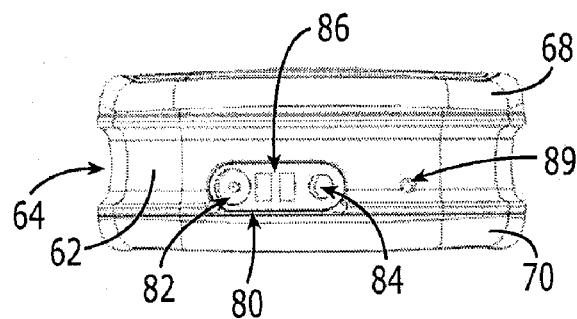
FIG. 7 is a bottom view of one embodiment of a cellular phone employing interlocking body covers and an interlocking chassis of the present invention.

FIG. 7 is a bottom view of one embodiment of a cellular phone employing interlocking body covers and an interlocking chassis of the present invention. From this angle, different external system connections, such as a power connector 82, a headset connector 84, and charging stand connectors 86 are visible in the recessed groove 64 of the chassis 62 between the front cover 68 and the back cover 70. The microphone port or recess 89 is also visible. While FIGS. 4-7 depict embodiments of a mobile terminal having a number of particular features, it should be apparent that a mobile terminal incorporating the principles of the present invention need not have all of the features and/or may have additional features, if desired.

Figure 8:
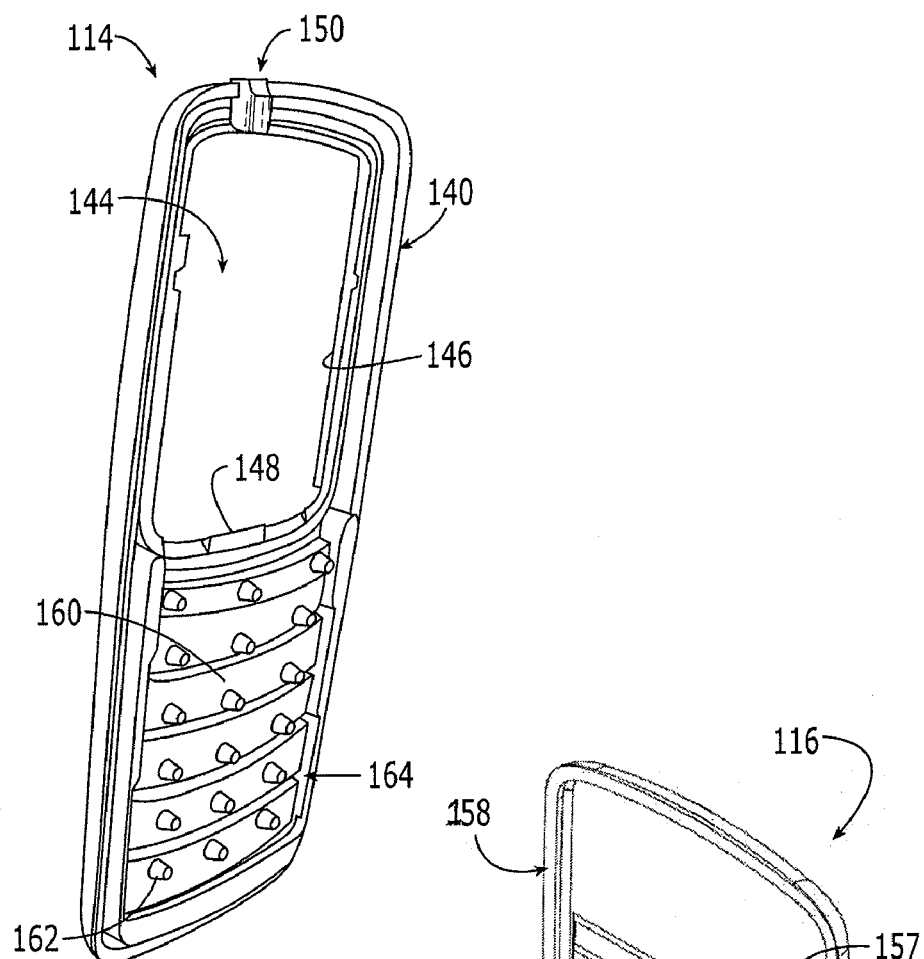
FIG. 8 is a perspective view of the internal surface of a front interlocking body cover of one embodiment of the present invention shown from the right side.

FIG. 8 is a perspective view of a front interlocking body cover of one embodiment of the present invention. This embodiment is shown from the internal surface and right side of the front cover 114. The locking edge 140, alignment extension and/or power button 150 and void or window locking edges 146, 148 are visible from the internal surface of the front cover 114. The internal surface or membrane of the front cover 114 includes a flexible keymat 160 with keydome switch actuators or keymat actuators 162. Grooves 164 are located between rows of keydome switch actuators. Grooves are intended to allow a user to selectively engage an individual keydome switch by a single keydome switch actuator. By including grooves in a keymat, keydome switch actuators may be located closer to each other than if the grooves were not included. Adjacent keydome actuators with a groove between them are less likely to inadvertently activate a keydome switch that is not intended to be depressed by a keydome switch actuator.

Figure 9:
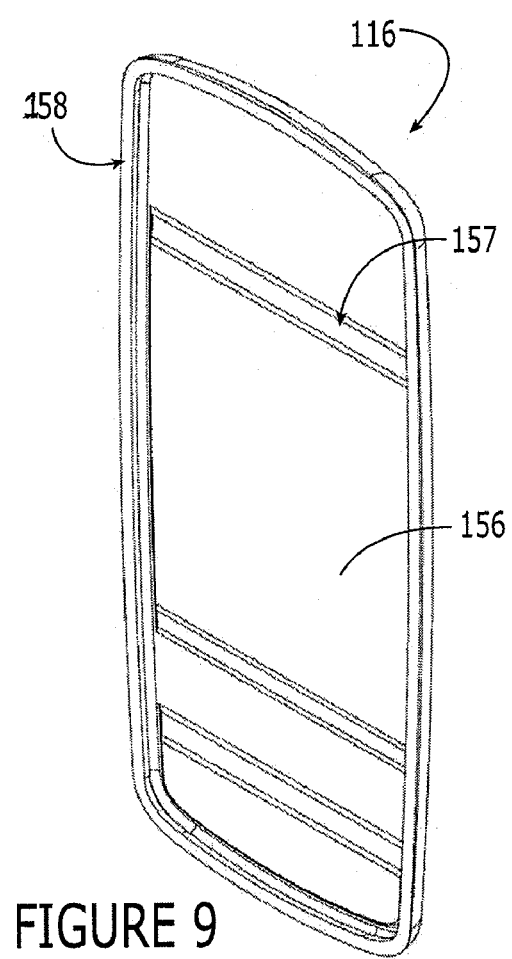
FIG. 9 is a perspective view of the internal surface of a rear interlocking body cover of one embodiment of the present invention shown from the right side.

FIG. 9 is a perspective view of a rear interlocking body cover of one embodiment of the present invention. This embodiment is shown from the internal surface and right side of the rear body cover 116. From this angle the locking edge 158 is visible around the inner surface of the membrane 156. Also visible are ridges or contours 157 that may be included in a lid or cover to create a more conforming fit between the lid or cover and the chassis and electronic device contained therein.

Figure 10:
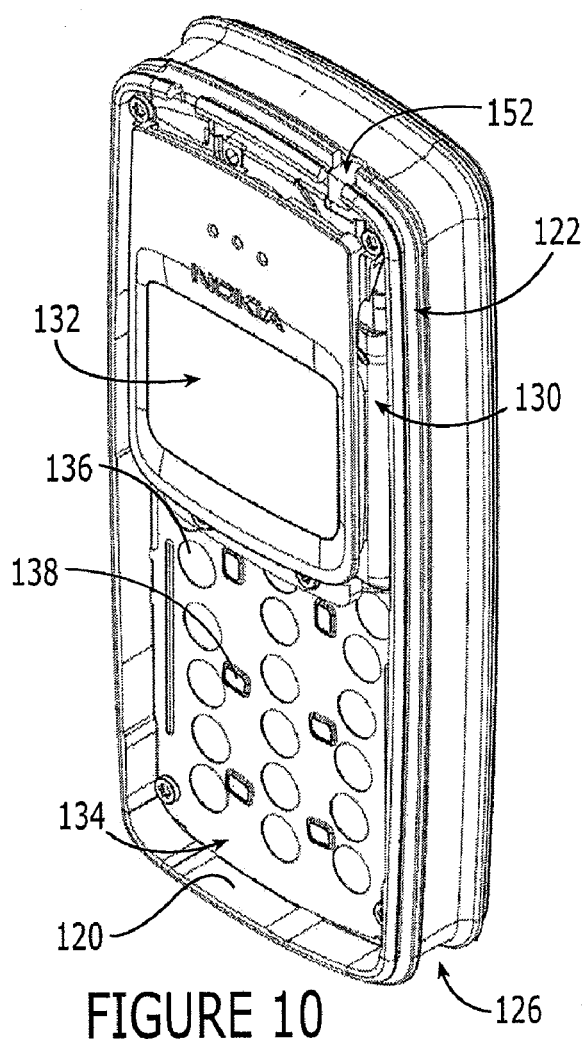
FIG. 10 is a perspective view of one embodiment of an interlocking chassis of a cellular phone of the present invention shown from the front and right side.

FIG. 10 is a perspective view of one embodiment of a chassis and an associated electronic device, such as for a cellular phone, according to the present invention. This embodiment is shown from the front and right side of the chassis 120. Visible from this angle are a front locking perimeter 122, a portion of the electronic device 130 housed in the chassis 120, an indentation 152 to accept an extension 150 on a lid or cover, a liquid crystal display 132, and a keypad 134 that includes keydome switches 136 and light emitting diodes 138. A locking edge of a front cover would secure a front cover to the chassis 120 by interlocking along the front locking perimeter 122. For example, the front cover of FIG. 8 is designed to mount to the chassis of FIG. 10 since the front cover has corresponding features to those of the chassis. Also visible in the embodiment of FIG. 10 is a groove 126 in the outer edge of the chassis.

Figure 11:
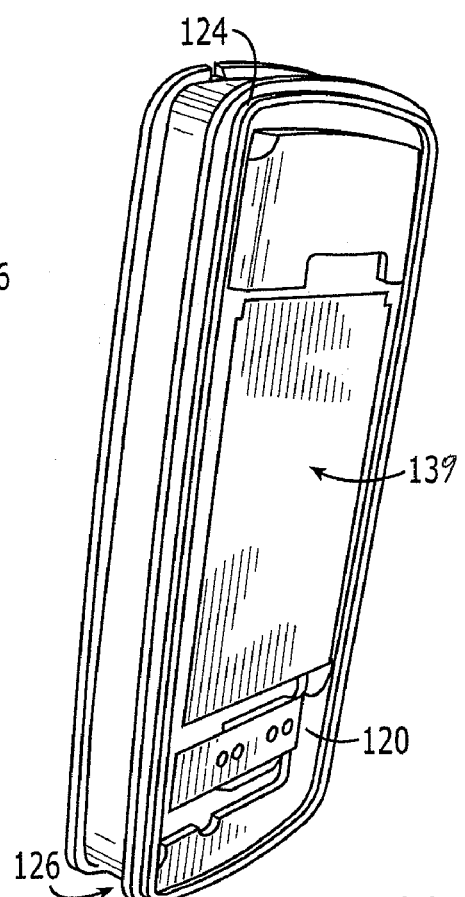
FIG. 11 is a perspective view of one embodiment of an interlocking chassis of a cellular phone of the present invention shown from the rear and right side.

FIG. 11 is a perspective view of one embodiment of a chassis and an associated electronic device, such as for a cellular phone, according to the present invention. This embodiment is shown from the rear and right side of the chassis 120. Visible from this angle is an internal battery 139, a groove 126 in the outer edge of the chassis 120, and a rear locking perimeter 124. A locking edge of a rear cover would secure a rear cover to the chassis 120 by interlocking along the rear locking perimeter 124. For example, the rear cover of FIG. 9 is designed to mount to the chassis of FIG. 10 since the rear cover has corresponding features to those of the chassis.

FIG. 12 is a cross sectional schematic view taken from side to side of one embodiment of a mobile terminal, and in particular, a cellular telephone, having interlocking front and rear body covers and an interlocking chassis according to the present invention. This cross-section is taken, for example, as line 12-12 in FIG. 2. Because this cross sectional schematic view exposes a front cover 268 at a point where a window 244 is defined therethrough, the front cover 268 appears disconnected on opposite sides of the chassis 220. However, the front cover 268 is not disconnected, but is continuous around the window 244 and forms a continuous locking edge 240 around the front cover 268. By comparison, the back cover 256 does not have a window and, therefore, appears to be a continuous surface.

The locking edges of the front and rear body covers and the locking perimeters of the interlocking chassis may have various profiles. One embodiment of locking edges and locking perimeters that interlock to connect a lid or cover to a chassis are shown in FIG. 12. In the embodiment of FIG. 12, the front cover 268 is attached to the chassis 220 by a locking edge 240 that interlocks with a front locking perimeter 222 of the chassis 220. The back cover 256 interlocks with the chassis 220 by the locking edge 258 that intersects with a rear locking perimeter 224. In each instance, the varying cross-section of the edge of the cover interlocks with a reverse or negative corresponding varying cross-section of a perimeter of the chassis. This function, and alternate possible embodiments are shown in FIGS. 14a-14h. The edges and perimeters may correspondingly interlock continuously around a cover or in any interrupted manner that securely attaches a cover to a chassis. While the embodiment of FIG. 12 includes identical locking edges and locking perimeters for the front and rear covers, the front and rear covers may attach to the chassis in different manners if so desired. Additionally, one of ordinary skill in the art will recognize that other interlocking shapes for continuous interlocking edges and perimeters may be used with the present invention.

Also visible in the embodiment of FIG. 12 are internal components of an electronic device that may be housed within the chassis. For example, a power source or battery 302 may be retained by the chassis at a position where the battery 302 would be accessible to a user if the back cover 256 were removed. The design of an electronic device housed within a chassis covered by front and rear covers allows for easy replacement of parts of the electronic device if required. For example, a replacement battery could easily be installed and the old battery removed by removing a back cover. A liquid crystal display 232 is visible through the window 244. In the embodiment of a front cover 268 shown in FIG. 12, the window 244 defined within the membrane of the front cover 268 is a clear protective structure in front of the liquid crystal display 232 to protect the liquid crystal display 232 and allow a user to visibly see the liquid crystal display 232 through the clear or transparent window 244. Internal structures such as a metal frame 304 and window gasket 303 may be incorporated with the electronic device or the chassis 220. A printed circuit board (PCB) or printed wiring board (PWB) 306 can also be seen.

FIG. 13 is a cross sectional view taken through the top and bottom of one embodiment of interlocking front and rear body covers and an interlocking chassis of the present invention for a cellular phone. This cross-section is taken, for example, as line 13-13 in FIG. 2. This embodiment, like that shown in FIG. 12, shows the front cover 268 separated by a window 244. Again, this separation is only caused by the fact that the cross section is taken at a point in the front cover 268 where a window 244 is defined in the membrane. A window may be permanently fixed to the membrane of a front cover, for example by an adhesive or molding process. A window may include audio or sound recesses 288 to allow a user to hear sound from a speaker of the electronic device. The window 244 of a front cover 268 may be locked to the chassis 220 using strategically located pins or other suitable mechanical latches as required. Example locking edges 146, 148 are shown in FIG. 8 and locking edges 46, 48 are shown in FIG. 1. A display window may be a transparency used to protect a display and limit the permeable regions between a cover and a chassis. Alternatively, a display screen may fill a front or back cover void and plug into an interface of the electronic device retained by the chassis. By incorporating a display on a front cover, a user would be able to update screens and associated screen features if supported by the electronics, for example updating a display from black and white to color. A display screen may be permanently fixed to the mobile phone engine. In such a case, the cover would include a corresponding void or window for mating with the display screen. The void or window locking edges of the cover may be marginally undersized from the display screen on the electronic device to avoid viewing around the display screen and the cover may include various hidden tabs or locking mechanisms to ensure a neat and secure flush fit around the window. A void or window of a cover may be molded slightly undersized so the void or locking edges can stretch over and/or around a display screen.

The window 244 shown in the embodiment of FIG. 13 is permanently affixed to the front cover by an adhesive or molded structure at the intersection 347, 359 of the window 244 and the front cover membrane 268. A mechanical or contoured interface may exist between the edge of the window 349, 357 and the edge for the window opening 348, 358 of the front cover membrane 268. The window 244 of the front cover 268 is clear or transparent to allow for viewing of the LCD display module 232. A metal frame 304 and LCD gasket 303 may be used to support the liquid crystal display 232 and the window 244 as it is secured to the chassis 220 as part of the front cover 268. Also visible in the embodiment shown in FIG. 13 is the keymat 360. Visible on the internal surface of the front cover membrane as part of the keymat 360 are keymat plungers 361 and keydome switch actuators 362. Keymat plungers 361 and keydome switch actuators 362 are positioned according to the location of keydome switches 337 on the internal electronic device housed by the chassis 220. Grooves 364, 365 may be positioned between horizontal or vertical rows of keymat plungers 361 and keydome switch actuators 362 to provide for individual engagement of selective keys. The material of the front cover 268 at the location of the keymat 360, or any other particular location, may be made from a transparent or translucent material to allow light from a light emitting diode (LED) 338 or other light source of the internal electronic device to penetrate through the cover material so the light is visible to a user. This translucency allows the keymat 360 to effectively be illuminated so as to appear backlit. Strategic locations of light emitting diodes (LEDs) on a PCB 306 may sufficiently illuminate the keymat 360 legible for use in the dark or in dim light situations. Translucency also has the advantage of creating a dramatic glow through a cover due to the single expanse of the elastomeric or pliable material of the cover. Covers may be made available in a range of semi-translucent tints and/or half-paint for aesthetic variation. Similarly, clear and/or opaque regions may be incorporated in the material of a cover.

The embodiment shown in FIG. 13 also clearly depicts the interlocking of a locking edge 240 of the front cover 268 and a front locking perimeter 222 of a chassis 220. Similarly, a back cover 256 is secured to the chassis 220 by a locking edge 258 at a rear locking perimeter 224 of the chassis 220. Internal components of an electronic device housed by the chassis 220 may include an antennae module 312, a battery or other power source 302, a PCB 306, a SIM cover 308, and external system connectors 310.

FIGS. 14A, 14B, 14C, 14D, 14E, 14F, and 14G show cross sectional diagrams of perimeters and edges of various embodiments of interlocking chassis and interlocking body covers of the present invention. By varying the cross section around the rim of a cover, for example, the sidewalls being roughly half the thickness of the retaining lip or return, an effective rubber hoop or loop is created, described in this application as a locking edge of a cover. In other words, the rim of the cover may define an inwardly facing groove for engaging on outwardly projecting rib of the locking perimeter. Interlocking edges may be made with different sizes, or corresponding contours that match the chassis. For example, interlocking edges 500, 502, 504 are shown with varying sizes that may allow a cover to extend beyond and around the locking perimeter of the chassis. Additional protection is provided to the chassis and the electronic device housed therein by extending the soft, pliable material of a cover beyond the chassis. This may decrease the chance that the chassis will be impacted by an external force that might damage the electronic device housed therein. A cover that extends beyond the chassis may absorb a large portion of an external force without translating a substantial amount of force to the chassis and the corresponding electronic device housed therein. Such a design further increases the protection provided by a soft-on-hard approach of embodiments of the present invention whereby pliable or elastomeric covers are secured to a rigid chassis, possibly decreasing field failure rates. Various sizes and types of interlocking contours may be created for corresponding covers and chassis. For example, the surface of an interlocking edge 510 may be smoothly continued by a locking perimeter 512 along the intersection of the locking edge 510 and the locking perimeter 512, thereby forming almost a continuous external surface. Similarly, the convex groove of a chassis may be continued from the outer surface of a locking perimeter 522 onto a locking edge 520 of a cover. A cover and a chassis may be designed with what may be characterized from the external visual perspective of the combined surface of the cover and chassis as continuous 522, 520; discontinuous 518, 516; or neutral 512, 510 intersections. Although only descriptive, continuous refers to where the external surface of a chassis and cover are designed to create a single curve or plane; discontinuous refers to where the external surface of a chassis does not match the external surface of a cover; and neutral refers to where a chassis and cover may not be designed with a particular surface feature or functionality in mind. The variations of cross-sections of edges and perimeters can be any type of interlocking design that permits a cover to securely attach to a chassis. For example, a cover 511 may have a different edge cross section than that of another cover 510, and a chassis 513 may have a different perimeter cross section that that of another perimeter 512.

FIG. 15 is a perspective view of one embodiment of a cellular phone employing interlocking body covers in an interlocking chassis of the present invention with a bead bracelet in a groove of the chassis. In addition to the soft-on-hand approach, the added personalization provided by the bead bracket permits market place differentiation for a phone or other device employing embodiments of the present invention. The continuous, uninterrupted channel or groove running around the chassis may be used for affixing a range of separate elastic bracelets and bands for both cosmetic and functional advantage. FIGS. 15, 16, 17, 18, and 19 show examples of different beads and bands which may be employed. To provide visual customization and personalization of a cellular phone or other personal device, different bands or bracelets may be wrapped around the chassis of an assembly for a mobile terminal of the present invention. For example, a bead bracelet 400 may be a string of wooden beads laced together with an integral on/off cinch-clasp. These "worry-beads" may be positionally fixed in and around the groove of a chassis or allowed to move freely around the circumference of and in the groove of the chassis. By rotating the worry-beads, a user may enjoy a form of meditative ritual, pacification, and play-factor of a user's fingers.

FIG. 16 is a perspective view of one embodiment of a cellular phone employing interlocking body covers and an interlocking chassis of the present invention with a changeable bead bracelet in a groove of the chassis. This embodiment is another example of a bracelet or band that may be employed in the groove around the chassis of an interlocking phone cover system of the present invention. A changeable bead bracelet or nametag bracelet 410 may be a string of plastic beads laced together. Some or all of the beads may incorporate an acceptance mechanism such as a tray or snap capable of accepting an interchangeable bead cap which may include a color or a alpha-numeric initial and/or symbol. By creating particular combinations of colors, letters, numbers, or symbols, a user may impart a personal touch and/or identification to his/her device. For example, a user may choose to indicate a child's name or message on the beads. The embodiment shown in FIG. 16 employs an N 416, O 415, K 414, I 413, and A 412 to represent NOKIA on the bead bracelet 410.

FIG. 17 is a perspective view of one embodiment of a cellular phone employing interlocking body covers and an interlocking chassis of the present invention with a rubber wrap in a groove of the chassis. A rubber wrap or rubber band 420 may be a continuous elastic rubber band that fits snuggly into the c-channel or groove of the chassis. This rubber wrap 420 may provide an improved tactile gripping zone. A rubber wrap 420 that further envelops a personal electronic device provides additional shock-absorbing material for superior impact protection. Similarly, an external system connector may be protected from dust and/or moisture ingress, rendering the personal electronic device relatively impervious to external elements.

FIG. 18 is a perspective view of one embodiment of a cellular phone employing interlocking body covers and an interlocking chassis of the present invention with a repetitive wrap in a groove of the chassis. A repetitive wrap 430 may be a length of string, cord, rope, or similar material. Alternatives may include links of cloth, plastic, and wire. Any type of material that may be wrapped and tied or otherwise affixed around the chassis may be used.

FIG. 19 is a perspective view of one embodiment of a cellular phone employing interlocking body covers and an interlocking chassis of the present invention with a light bracelet in a groove of the chassis. A light bracelet 440 may be an electro-luminescent fabric, light strand or wrap, or electrically-able "light-bead" loop around the chassis. A light bracelet 440 may plug into an external connector of the personal electronic device recessed within the chassis groove. This connection allows the personal electronic device to power and control the various multi-colored light sequences for mode signaling and/or aesthetic effect. For example, a light bracelet 440 may illuminate in a particular pattern during an incoming call signal. A different light pattern may be presented when a message has been received. A light bracelet 440 may even be used to indicate a particular caller; for example, incoming calls or messages from caller A may be represented in a red luminescence and incoming calls or messages from caller B may be indicated by a green luminescence.

FIG. 20 is a cross-sectional schematic diagram taken from side to side of one embodiment of interlocking front and rear body covers 602, 606 and an interlocking chassis 604 of the present invention. While the present invention has been described with edges overlapping perimeters to interlock a cover to a chassis, one of ordinary skill in the art will recognize that the present invention also includes covers that interlock inside a chassis perimeter. An example of covers 602, 606 that interlock inside a chassis 604 are provided in FIG. 20; and similar to FIGS. 14A-14G, one of ordinary skill in the art will recognize that interlocking edges and perimeters where the covers interlock inside a chassis can be designed with any number of shapes and configurations.

A cover may be multicolored to create dramatic looks. Additionally, mechanical performance of a cover may be fine-tuned depending upon particular properties of a material used for a particular area of a cover. For example, the outer loop of the interlocking edge of a cover may have specific properties, such as strength, durability, and elasticity, suited to secure the cover to the chassis and the inner membrane of the cover may be better suited for key tactility and aesthetic look. By way of example, as applied to FIG. 1, the locking edges 40, 58 may be made from a harder rubber polymer while the inner membranes 42, 56 are made of a softer silicon material. These materials may be integrally formed into a single part or affixed as two pieces of a single part. Additional features may be incorporated in interlocking covers of the present invention. For example, by molding a rear cover from a reasonably translucent or transparent material and inserting an appropriately sized picture template or card beneath, the backside of a personal electronic device may provide a picture frame offering the user an additional level of personality and unique identification feature for a personal electronic device employing an interlocking cover and chassis of the present invention.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An assembly for a mobile terminal, comprising:
a chassis, wherein said chassis comprises a continuous first locking perimeter and a continuous second locking perimeter;
a first elastomeric covering capable of being removably secured to said chassis at said first locking perimeter, wherein said first covering comprises a first locking edge for securing said first covering to said chassis by interlocking said first locking edge and said first locking perimeter,
wherein a portion of said covering defines a cavity adapted to receive a portion of said chassis, and
wherein said chassis and said covering are adapted to interlock by said covering overlapping said chassis and said portion of said chassis being disposed in said cavity of said covering;
a second elastomeric covering capable of being removably secured to said chassis at said second locking perimeter, wherein said second covering comprises a second locking edge for securing said second covering to said chassis by interlocking said second locking edge and said second locking perimeter; and
an electronic device retained by said chassis.

2. The assembly of claim 1, wherein said first covering defines a circumscribed void there through.

3. The assembly of claim 1, wherein said first covering comprises a plurality of actuators that selectively engage said electronic device.

4. The assembly of claim 3, wherein said first covering defines a circumscribed void there through.

5. The assembly of claim 4, further comprising a display window disposed in said void.

6. The assembly of claim 3, wherein each of said actuators comprises a keymat plunger.

7. The assembly of claim 3, wherein said first covering comprises grooves between at least two of said actuators.

8. The assembly of claim 3, wherein said plurality of actuators provide interface control of said electronic device.

9. The assembly of claim 3, wherein said plurality of actuators define at least a numeric keypad.

10. The assembly of claim 9, wherein said first covering comprises grooves between rows of said actuators defining a numeric keypad.

11. The assembly of claim 1, wherein said first locking perimeter and said first locking edge define a convex surface.

12. The assembly of claim 1, wherein said first locking perimeter and said first locking edge define a concave surface.

13. The assembly of claim 1, wherein said first locking edge extends outwardly from said chassis and said first locking perimeter to define a ridge at the intersection of said first locking edge and said first locking perimeter.

14. The assembly of claim 1, wherein said chassis defines a convex groove between said first and second locking perimeters.

15. The assembly of claim 14, further comprising at least one of a bracelet and a wrap in said groove.

16. The assembly of claim 1, wherein said first locking perimeter and said second locking perimeter define a convex groove.

17. The assembly of claim 16, further comprising at least one of a bracelet and a wrap in said groove.

18. The assembly of claim 1, wherein said first locking perimeter, said second locking perimeter, said first locking edge, and said second locking edge define a convex groove.

19. The assembly of claim 18, further comprising at least one of a bracelet and a wrap in said groove.

20. The assembly of claim 1, wherein said first locking edge extends outwardly from said chassis and said first locking perimeter to define a discontinuous intersection of said first locking edge and said first locking perimeter.

21. The assembly of claim 1, wherein said first locking edge extends outwardly from said chassis and said first locking perimeter to define a neutral intersection of said first locking edge and said first locking perimeter.

22. The assembly of claim 1, wherein said first locking edge extends outwardly from said chassis and said first locking perimeter to define a continuous intersection of said first Locking edge and said first locking perimeter.

23. An interlocking body cover for a mobile terminal, comprising:
a membrane with a first surface and a second surface, an inner section, and an outer perimeter; and
an elastomeric locking edge along said outer perimeter directed downwardly from said second surface and towards said inner section, wherein said elastomeric locking edge is configured to be removably secured to an interlocking chassis of a mobile terminal without disassembly of the chassis
wherein said membrane is adapted to cover an operational face of the mobile terminal, the operational face having at least one of a display screen and a user-operable button of the mobile terminal,
wherein said elastomeric locking edge is configured to be removably secured to an interlocking chassis without disassembly of the chassis,
wherein said membrane is adapted to overlap said interlocking chassis, and
wherein a portion of said membrane defines a cavity adapted to receive a portion of said chassis such that said portion of said interlocking chassis is disposed in said cavity of said membrane.

24. The interlocking body cover of claim 23, wherein at least part of said membrane is a translucent material.

25. The interlocking body cover of claim 23, wherein at least one of said membrane and said locking edge is a multicolored material.

26. The interlocking body cover of claim 23, wherein said membrane defines a circumscribed void there through.

27. The interlocking body cover of claim 26, further comprising a display window disposed in said void.

28. The interlocking body cover of claim 23, wherein said second surface defines a flexible keymat.

29. The interlocking body cover of claim 28, wherein said keymat comprises a plurality of actuators.

30. The interlocking body cover of claim 29, wherein said keymat comprises grooves between at least two of said actuators.

31. The interlocking body cover of claim 29, wherein said plurality of actuators define at least a numeric keypad.

32. The interlocking body cover of claim 31, wherein said keymat comprises grooves between rows of said actuators defining a numeric keypad.

33. An interlocking chassis for a mobile terminal, comprising:
- a rigid circumferential frame with an outer surface, an inner surface, a first surface, a second surface, a front edge, and a rear edge, wherein said front edge comprises a continuous first locking perimeter, and wherein said rear edge comprises a continuous second locking perimeter, wherein said frame is configured to have an elastomeric locking edge of a first membrane removably secured to the first locking perimeter and to have an elastomeric locking edge of a second membrane removably secured to the second locking perimeter without disassembly of the frame.

34. The interlocking chassis of claim 33, further defining a concave groove along said outer surface of said circumference.

35. The interlocking chassis of claim 33, further comprising an inner structure attached to said circumferential frame at said inner surface for securely retaining components of an electronic device.

36. An assembly for a mobile terminal, comprising:
- a chassis, wherein said chassis comprises a continuous first locking perimeter;
- a first elastomeric membrane capable of being removably secured to said chassis at said first locking perimeter, wherein said first elastomeric membrane comprises a first locking edge for securing said first elastomeric membrane to said chassis by locking said first locking edge and said first locking perimeter; and
- an electronic device retained by said chassis,
- wherein said chassis further comprises a continuous second locking perimeter, further comprising:
- a second elastomeric membrane for removably securing to said chassis at said second locking perimeter, wherein said second elastomeric membrane comprises a second locking edge for securing said second elastomeric membrane to said chassis by locking said second locking edge and said second locking perimeter.

37. An assembly for a mobile terminal, comprising:
- a chassis, wherein said chassis comprises a continuous first locking perimeter;
- a first elastomeric membrane capable of being removably secured to said chassis at said first locking perimeter, wherein said first elastomeric membrane comprises a first locking edge for securing said first elastomeric membrane to said chassis by interlocking said first locking edge and said first locking perimeter; and
- an electronic device retained by said chassis,
- wherein said chassis further comprises a continuous second locking perimeter, further comprising:
- a second elastomeric membrane for removably securing to said chassis at said second locking perimeter, wherein said second elastomeric membrane comprises a second locking edge for securing said second elastomeric membrane to said chassis by interlocking said second locking edge and said second locking perimeter.

38. The assembly of claim 37, wherein said first elastomeric membrane defines a circumscribed void there through.

39. The assembly of claim 37, wherein said first elastomeric membrane comprises a plurality of actuators that selectively engage said electronic device.

40. The assembly of claim 39, wherein said first elastomeric membrane defines a circumscribed void there through.

41. The assembly of claim 40, further comprising a display window disposed in said void.

42. The assembly of claim 39, wherein each of said actuators comprises a keymat plunger.

43. The assembly of claim 39, wherein said first elastomeric membrane comprises grooves between at least two of said actuators.

44. The assembly of claim 39, wherein said plurality of actuators provide interface control of said electronic device.

45. The assembly of claim 39, wherein said plurality of actuators define at least a numeric keypad.

46. The assembly of claim 45, wherein said first elastomeric membrane comprises grooves between rows of said actuators defining a numeric keypad.

47. The assembly of claim 37, wherein said chassis defines a convex groove between said first and second locking perimeters.

48. The assembly of claim 47, further comprising at least one of a bracelet and a wrap in said groove.

49. The assembly of claim 37, wherein said first locking perimeter and said second locking perimeter define a convex groove.

50. The assembly of claim 49, further comprising at least one of a bracelet and a wrap in said groove.

51. The assembly of claim 37, wherein said first locking perimeter, said second locking perimeter, said first locking edge, and said second locking edge define a convex groove.

52. The assembly of claim 51, further comprising at least one of a bracelet and a wrap in said groove.

53. An interlocking body cover for a mobile terminal, comprising:
- a membrane with a first surface and a second surface, an inner section, and an outer perimeter; and
- an elastomeric locking edge along said outer perimeter directed downwardly from said second surface and towards said inner section, wherein said elastomeric locking edge is configured to be removably secured to an interlocking chassis of a mobile terminal without disassembly of the chassis,
- wherein said elastomeric locking edge is configured tote removably secured to an interlocking chassis without disassembly of the chassis,
- wherein said membrane is adapted to overlap said interlocking chassis,
- wherein a portion of said membrane defines a cavity adapted to receive a portion of said chassis such that said portion of said interlocking chassis is disposed in said cavity of said membrane, and
- wherein at least part of said membrane is a translucent material.

54. An interlocking body cover for a mobile terminal, comprising:
- a membrane with a first surface and a second surface, an inner section, and an outer perimeter;
- an elastomeric locking edge along said outer perimeter directed downwardly from said second surface and towards said inner section, wherein said elastomeric locking edge is configured to be removably secured to an interlocking chassis of a mobile terminal without disassembly of the chassis,
- wherein said elastomeric locking edge is configured to be removably secured to an interlocking chassis without disassembly of the chassis,
- wherein said membrane is adapted to overlap said interlocking chassis,
- wherein a portion of said membrane defines a cavity adapted to receive a portion of said chassis such that said portion of said interlocking chassis is disposed in said cavity of said membrane, and
- wherein said membrane defines a circumscribed void there through;
- and a display window disposed in said void.

55. An interlocking body cover for a mobile terminal, comprising:
- a membrane with a first surface and a second surface, an inner section, and an outer perimeter; and
- an elastomeric locking edge along said outer perimeter directed downwardly from said second surface and towards said inner section, wherein said elastomeric locking edge is configured to be removably secured to an interlocking chassis of a mobile terminal without disassembly of the chassis,
- wherein said elastomeric locking edge is configured to be removably secured to an interlocking chassis without disassembly of the chassis,
- wherein said membrane is adapted to overlap said interlocking chassis,
- wherein a portion of said membrane defines a cavity adapted to receive a portion of said chassis such that said portion of said interlocking chassis is disposed in said cavity of said membrane, and
- wherein said second surface defines a flexible keymat.

56. The interlocking body cover of claim 55, wherein said keymat comprises a plurality of actuators.

57. The interlocking body cover of claim 56, wherein said keymat comprises grooves between at least two of said actuators.

58. The interlocking body cover of claim 56, wherein said plurality of actuators define at least a numeric keypad.

59. The interlocking body cover of claim 58, wherein said keymat comprises grooves between rows of said actuators defining a numeric keypad.

* * * * *

UNITED STATES PATENT AND TRADEMARK OFFICE
CERTIFICATE OF CORRECTION

| | | |
|---|---|---|
| PATENT NO. | : 7,236,588 B2 | Page 1 of 1 |
| APPLICATION NO. | : 10/734388 | |
| DATED | : June 26, 2007 | |
| INVENTOR(S) | : Gartrell | |

It is certified that error appears in the above-identified patent and that said Letters Patent is hereby corrected as shown below:

Column 18,

Line 35, "tote" should read --to be--.

Signed and Sealed this

Thirteenth Day of November, 2007

JON W. DUDAS
*Director of the United States Patent and Trademark Office*